United States Patent [19]

Imai et al.

[11] Patent Number: 4,666,591
[45] Date of Patent: May 19, 1987

[54] SLAG DISPOSAL METHOD

[75] Inventors: Keiji Imai, Ibaraki; Shigenori Nagaoka, Chiba; Shinji Kogumazaka, Funabashi; Takeshi Imagawa, Ibaraki; Hidenaga Ishii, Tokyo; Toshitsugu Kikuchi, Takasaki, all of Japan

[73] Assignees: Kawasaki Jukogyo Kabushiki Kaisha, Kobe; Ishii Syoji, Ltd., Tokyo, both of Japan

[21] Appl. No.: 688,888

[22] Filed: Jan. 4, 1985

[30] Foreign Application Priority Data

Jan. 10, 1984 [JP] Japan ................... 59-2319
Jan. 10, 1984 [JP] Japan ................... 59-2321

[51] Int. Cl.⁴ .......... B03C 1/30; B03C 1/00; B02C 23/08; B02C 23/14
[52] U.S. Cl. ........................ 209/38; 209/2; 209/3; 209/214; 241/24; 241/78
[58] Field of Search ............ 75/1 R, 30, 24; 241/23, 241/24; 266/137; 209/2, 3, 214, 12, 38, 219, 213, 215; 241/76, 77, 78

[56] References Cited

U.S. PATENT DOCUMENTS

| | | | |
|---|---|---|---|
| 1,207,503 | 12/1916 | Conover et al. | 209/214 |
| 1,339,300 | 5/1920 | Swart et al. | 209/214 |
| 2,175,484 | 10/1939 | Rees et al. | 209/2 |
| 2,264,204 | 11/1941 | Reckett | 241/24 |
| 2,352,712 | 7/1944 | Heckett | 241/24 |
| 2,728,454 | 12/1955 | Heckett | 241/14 X |
| 2,971,703 | 2/1961 | Rath | 241/24 |
| 3,022,956 | 2/1962 | Haseman | 241/24 |
| 3,049,305 | 8/1962 | Rath | 241/24 |
| 3,081,954 | 3/1963 | Heckett | 241/24 |
| 3,165,268 | 1/1965 | Haussig | 241/24 |
| 3,178,122 | 4/1965 | Heckett | 241/76 |
| 3,272,330 | 9/1966 | Nelson | 209/210 |
| 3,822,799 | 7/1974 | Evans | 241/24 |
| 4,341,744 | 7/1982 | Brison et al. | 209/214 |

FOREIGN PATENT DOCUMENTS

| | | |
|---|---|---|
| 51-33047 | 9/1976 | Japan . |
| 51-147416 | 12/1976 | Japan . |
| 51-151615 | 12/1976 | Japan . |
| 52-33163 | 3/1977 | Japan . |
| 27917 | 2/1983 | Japan ................... 75/24 |

Primary Examiner—S. Leon Bashore
Assistant Examiner—Thomas M. Lithgow
Attorney, Agent, or Firm—Leydig, Voit & Mayer

[57] ABSTRACT

A slag disposal method for disposing of slags produced in furnaces during iron or steel making processes comprises employing the steps of magnetic sorting of masses of crude slags of a size greater than a value ranging between 300 to 500 mm obtained from the furnaces into slags rich in iron (above about 50 to 60 percent) and slags not rich in iron (below about 50 to 60 percent) and then applying a compressive force to the slags rich in iron to cause a coarse crushing and/or deformation to reduce the size and at the same time increase the iron content due to the breaking and separation of the slags from the metal. Further magnetic sorting and sieving after griding are provided to obtain concentrates having high iron content and to improve recovery efficiency.

1 Claim, 2 Drawing Figures

SLAG DISPOSAL METHOD

BACKGROUND OF THE INVENTION

The present invention relates to a method of disposing of various kinds of slags produced in iron and steel making processes and, more particularly, to a slag disposal method which permits an efficient recovery of concentrates rich in iron for further use in iron or steel making processes.

Heretofore, most slags produced in furnaces used in iron and steel making processes were disposed of. As a result, iron components in the slags which can be recovered were wasted.

In recent years, however, because of the demand for effective use of mineral resources, attempts have been made to recover concentrates in the slags which are rich in iron. More specifically, it has been proposed to recover the iron content in the form of concentrates directly from crude slages produced in furnaces used in iron or steel making processes by magnetic sorting. However, this method has been found to be inefficient since the slags are large in size and of low iron content. Therefore, as a further step to increase the iron content of the concentrates for use in iron or steel making processes, the stored slags have been reduced in size through grinding by means of a rod mill or an autogenous grinding mill. These proposals and attempts are disclosed, for example, in Japanese Patent Publication No. 33047/1976, Japanese Patent Laid-Open No. 147416/1976, Japanese Patent Laid-Open No. 151615/1976, and Japanese Patent Laid-Open No. 33163/1977.

In general, the known prior art slag disposal methods can be roughly summarized as follows.

(1) The maximum size of the crude slags to be disposed of is usually about 300 mm and the particle size, in some cases, has a value ranging between 300 mm and 500 mm.

(2) Slags of sizes smaller than 300 mm and having a high iron content of 50 to 60 percent are usually used directly as concentrates or after increasing the iron content up to 90 percent or higher by a rod mill or an autogenous grinding mill.

(3) Slags smaller than 300 mm and having a low iron content are subjected to magnetic sorting and sieving after crushing so as to provide concentrates directly or after an increase of the iron content through grinding by means of a rod mill or an autogenous grinding mill.

(4) Slags of sizes greater than 500 mm are sorted to determine the iron content by means of a lifting magnet or by visual check and only the portions having a low iron content are subjected to crushing into sizes smaller than 300 mm and then to various disposal treatments.

(5) Slags of sizes greater than 300 mm and having high iron content are often left without any treatment and, when disposed of, require extensive labor and heavy equipment. As recognized, slags of this size and iron content are often bulky and difficult to reduce in size by methods described above. As a result, the conventional disposal method for these slags often involves the first step of reducing size by means of dropping a weight of 2 to 5 tons on the slags. The slags can also be reduced by cutting by a gas burner or breaking by dynamite placed in holes drilled in the slags. Clearly, extreme care must be used due to dangerous scattering of iron fragments.

There is an increasing demand for development of a safe, less expensive method which permits efficient disposal of large masses of slags having high iron content to recover concentrates for further use in iron and steel making processes.

To meet this demand, Applicants have conducted various studies and experiments. In one such experiment, compressive force was applied to slags greater than 500 mm and having a higher iron content and the following results were observed.

(1) With pig iron, slags having iron content approximating 100 percent were roughly crushed and separated from the pig iron itself and from the slags attached to the pig iron or involved by the pig iron. The slags attached to the pig iron or involved by the pig iron had sizes which ranged in the smaller size section of the distribution range of the particles of roughly crushed pig iron.

(2) In the case of steel, slags attached to the steel or involved by the steel were separated as a result of a deformation of the steel by compressive force. Slags also were separated from thin portions of steel and from the defective parts, such as concavities and convexities in the steel surface or shrinkage holes in the steel.

(3) The iron content of the slags roughly separated in paragraphs (1) and (2) above was greater than the iron content of the slags attached to or involved by the metal; in some cases, iron content as high as 90 percent or higher was obtained.

In general, it is conventionally considered that metal in slags cannot be separated from the slags by crushing. Applicants have concluded, however, that the metal in slags does not exist in a homogeneous state, such as in steel sheets, cast steel or cast iron, but has many surface convexities and concavities, as well as cracks. In some cases casting defects such as shrinkage holes and blow holes are involved. Therefore, when compressive stresses are concentrated on the surfaces and internal defects of the metal so that the metal can be crushed by a force which is only a fraction of the compressive strength of the metal in the homogeneous state, it is clear that the force necessary for crushing the slags becomes smaller as the ratio of the cross-sectional area of the slags to the whole crushing cross-sectional area of the mass of slags and metal increases.

SUMMARY OF THE INVENTION

Based on the above experimental results and conclusions, it is a primary object of the present invention to provide a method of disposing of slags which permits an efficient recovery of concentrates rich in iron for further use in iron and steel making processes.

To this end, according to the invention, there is provided a slag disposal method for disposing of slags produced in furnaces during iron and steel making processes comprising sorting masses of crude slags obtained from the furnaces into slags rich in iron and slags not rich in iron by magnetic sorting and applying a compressive force to the slags rich in iron so as to cause a coarse crushing and/or deformation to reduce the size and separate the slags, thus obtaining slags having increased iron content.

The above and other objects, features and advantages of the invention will become clear from the following description of the preferred embodiments, taken in conjunction with the accompanying drawings.

DESCRIPTION OF THE PREFERRED EMBODIMENTS

Figure 1:
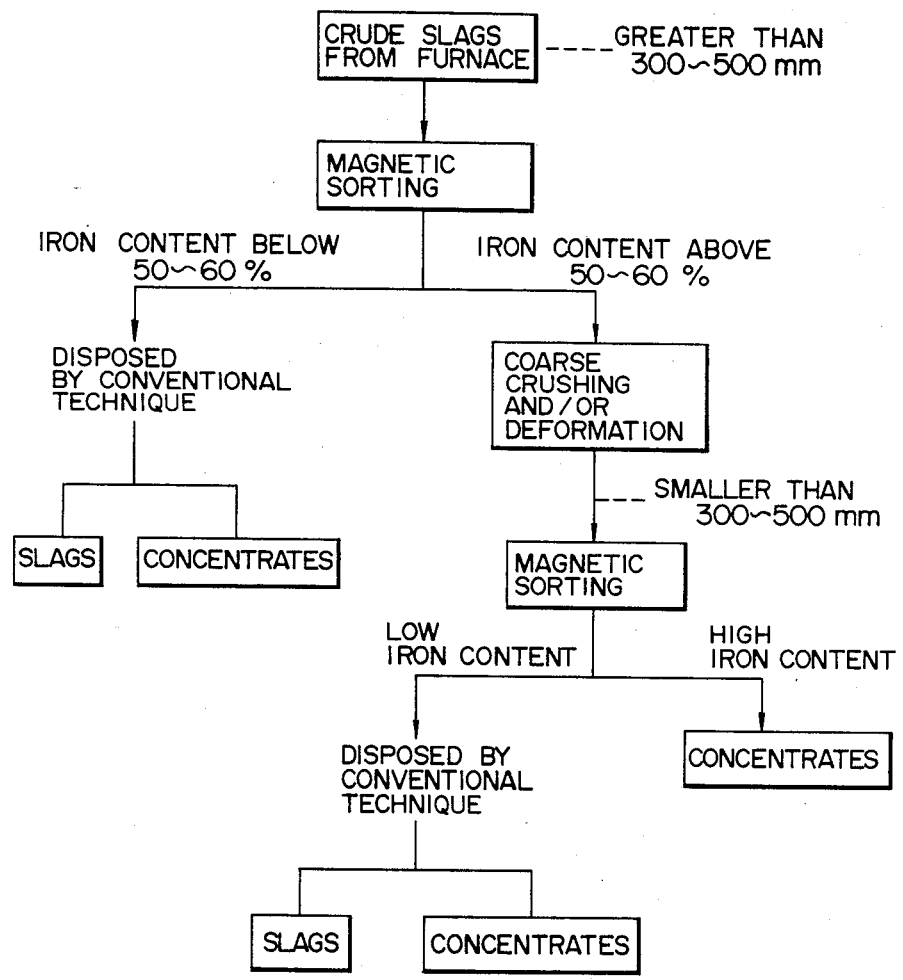
FIG. 1 is a flow chart of a first embodiment of a slag disposal method in accordance with the invention.

Referring first to FIG. 1 showing a first embodiment of the invention, masses of crude slags having particle sizes greater than a value between 300 and 500 mm, produced in a blast furnace, a converter or an electric furnace during iron or steel making processes, are subjected to a first magnetic sorting step by a magnetic sorter into slags rich in iron having an iron content higher than 50 to 60 percent and slags not rich in iron having an iron content lower than 50 to 60 percent. The slags rich in iron having an iron content higher than 50 to 60 percent are then fed to a crusher which applies a compressive force to the slags to coarsely crush or deform these slags into particle sizes smaller than a value ranging between 300 and 500 mm while separating these slags and obtaining a portion having increased iron content.

As also shown in FIG. 1, the crude slags having particle sizes greater than value ranging between 300 and 500 mm and not rich in iron, having an iron content lower than 50 to 60 percent, are disposed of by a conventional technique which entails being crushed by a compression crusher (rocking crusher) of the same type as that used in ordinary rock crushing.

The coarsely crushed and deformed slags having reduced sizes below a value ranging between 300 and 500 mm, a portion of which have increased iron content, are subjected to a second magnetic sorting to separate that portion of the slags having high iron content from the slags having low iron content. The slags having high iron content (above 80 percent in the test described below) are then collected and used as concentrates for iron or steel making processes while the slags having low iron content are disposed by conventional techniques.

In consequence, crude slags having particle sizes greater than a value ranging between 300 to 500 mm and an iron content above 50 to 60 percent are continuously and efficiently crushed into slags having particle sizes below that value and increased iron content, and these slags of increased iron content are collected so as to be used as concentrates for iron or steel making processes.

Applicants conducted a test in which 100 tons of crude slags, obtained from a blast furnace and having sizes above 400 mm and an iron content of 50 to 60 percent, were disposed of by the disposal method of this embodiment. As a result, concentrates usable in iron or steel making process, having sizes below 250 mm and an iron content of 80 to 85 percent, were recovered at a high efficiency within quite a short time of about 3 hours.

By way of comparison, when 100 tons of the same crude slags as above, having sizes above 400 mm and and iron content of 50 to 50 percent, were disposed of by a conventional method employing dropping a weight, it took about 40 hours for the slags to be disposed of satisfactorily. In addition, the work was quite dangerous due to scattering of fragments of slags and iron.

As will be realized from the foregoing description, the described first embodiment of the slag disposal method in accordance with the invention permits an efficient recovery of concentrates having an iron content of 80 percent or higher from crude slags having particle sizes greater than a value ranging between 300 to 500 mm and an iron content of 50 to 60 percent. In addition, the disposal of the slags can be completed in a short period of time and with enhanced safety because there is no scattering of slag or iron fragments.

The concentrates obtained through the slag disposal method of the described embodiment may be further subjected to grinding to obtain concentrates having an iron content exceeding 90 percent.

Figure 2:
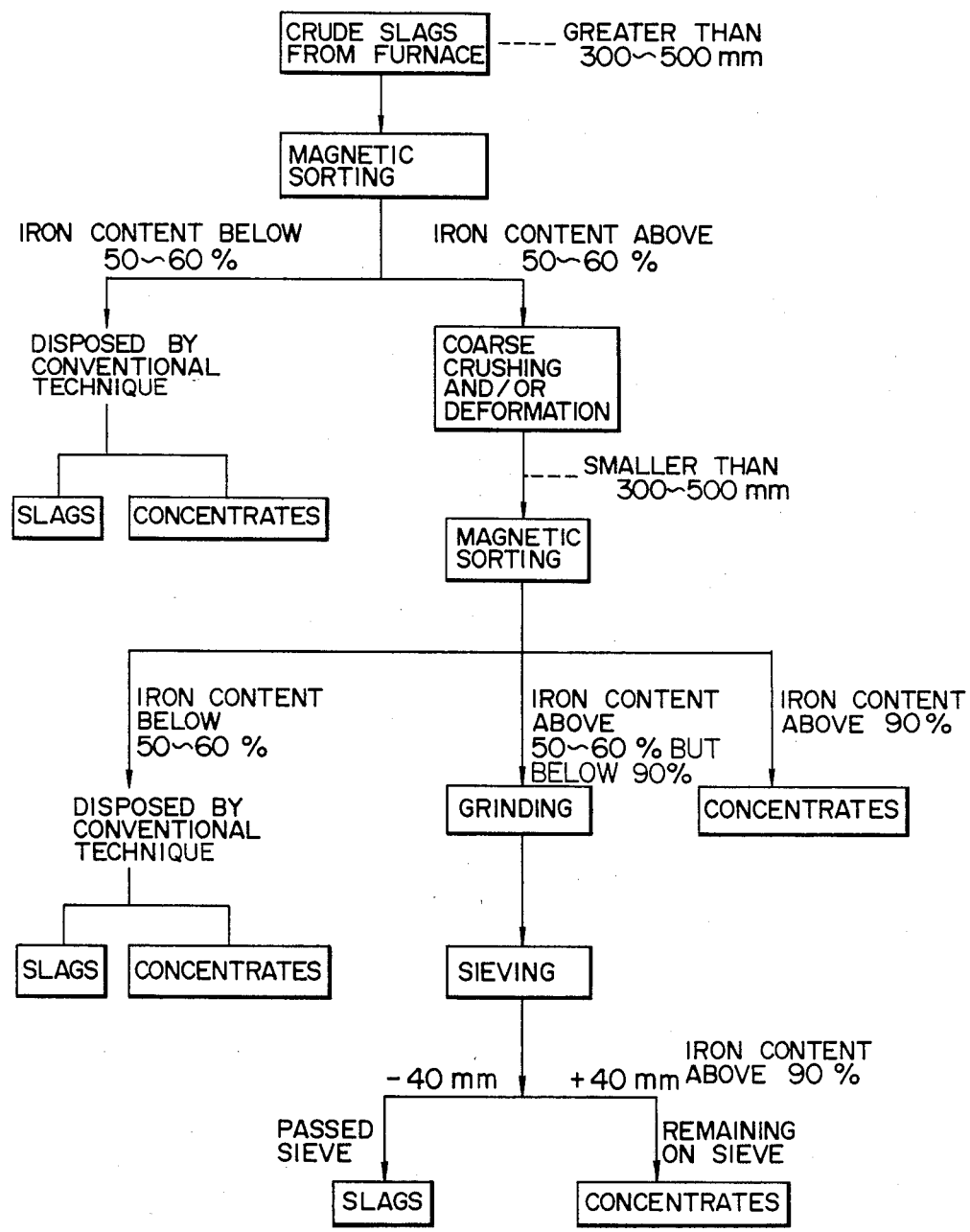
FIG. 2 is a flow chart of a second embodiment of the slag disposal method in accordance with the invention.

This second embodiment employs the same steps as in the first embodiment through the coarse crushing and deformation step and including the first magnetic sorting step, but the second magnetic sorting step is conducted in a manner different from that of the first embodiment, namely, in the second embodiment the coarsely crushed and deformed slags having particles of reduced size and increased iron content are subjected to a second magnetic sorting step so as to be sorted into slags having iron contents of different levels, above 90 percent, between 50 to 60 percent and 90 percent, and below 50 to 60 percent. The extracted slags having an iron content above 90 percent are collected to be used directly as concentrates in iron or steel making processes and the slags having an iron content of below 50 to 60 percent are disposed of by the conventional techniques previously described. The slags having iron content of less that 90 percent but above the 50 to 60 percent level are subjected to a grinding step to further reduce the size of the slags. The ground product is sieved through a vibrating sieve having a mesh size of 40 mm. As shown in FIG. 2, ground material having a high iron content exceeding 90 percent is left on the 40 mm sieve and this material is collected as concentrate for further use in iron or steel making processes. The slags which are passed through the 40 mm sieve are disposed of as waste because of their small iron content.

Using this second embodiment of the invention, a test was conducted to dispose of 100 tons of crude slags obtained from a blast furnace having sizes of above 400 mm and an iron content of 50 to 60 percent. As a result, concentratres usable in iron and steel making processes, having sizes smaller than 250 mm and an iron content exceeding 90 percent, were recovered efficiently in about 40 hours.

By way of comparison, when the same amount of crude slags were disposed of by a conventional method employing dropping of a weight, it took about 50 hours to attain the same result as above. In addition, the work was quite dangerous due to scattering of fragments of iron and slags.

Thus, the second embodiment of the invention permits a continuous and highly efficient recovery of concentrates having an iron content exceeding 90 percent from crude slags having a size greater than a value ranging between 300 and 500 mm and an iron content of 50 to 60 percent. In addition, the disposal is completed in quite a short time without any danger attributable to the flying of iron and slag fragments.

Although the invention has been described using specific terms, it is to be noted that the described embodiments are only illustrative and various modifications may be imparted thereto without departing from the scope of the invention which is limited solely by the appended claims.

What is claimed is:

1. A slag disposal method for disposing of slags produced in furnaces during iron or steel making processes comprising:

magnetically sorting masses of crude slags having only sizes greater than a value ranging between 300 mm and 500 mm obtained from said furnaces into slags having iron content above 50-60 percent and slags having iron content below 50-60 percent;

applying a compressive force to said slags with an iron content above said 50-60 percent so as to reduce the size below said value;

magnetically sorting said slags having sizes below said value into slags having iron content above 50-60 percent and slags having iron content below 50-60 percent; grinding said slags having sizes below said value and iron content above 50-60 percent;

subjecting the ground product to a sieving by a screen having a predetermined mesh size so as to produce slags of less than about 40 mm and concentrates of high iron content of greater than about 40 mm; and collecting said concentrates for further use in iron or steel making processes.

* * * * *